United States Patent [19]
Schulze

[11] Patent Number: 5,854,817
[45] Date of Patent: Dec. 29, 1998

[54] FAST SHUTDOWN SYSTEM AND PROCESS FOR FAST SHUTDOWN OF A NUCLEAR REACTOR

[75] Inventor: Joachim Schulze, Frankfurt, Germany

[73] Assignee: Siemens Aktiengesellscaft, Munich, Germany

[21] Appl. No.: 862,464

[22] Filed: May 23, 1997

Related U.S. Application Data

[63] Continuation of PCT/DE95/01611 Nov. 20, 1995.

[30] Foreign Application Priority Data

Nov. 23, 1994 [DE] Germany ............... 44 41 751.9

[51] Int. Cl.$^6$ ................................... G21C 9/027
[52] U.S. Cl. ............................................ 376/237
[58] Field of Search .................... 376/236, 237

[56] References Cited

U.S. PATENT DOCUMENTS

| | | | |
|---|---|---|---|
| 3,385,758 | 5/1968 | Gyorey et al. | 376/237 |
| 4,148,685 | 4/1979 | Brandes | 376/226 |
| 4,605,530 | 8/1986 | Tatemichi | 376/237 |
| 4,632,803 | 12/1986 | Bessho et al. | 376/236 |

FOREIGN PATENT DOCUMENTS

| | | |
|---|---|---|
| 0 103 249 A3 | 3/1984 | European Pat. Off. . |
| 0 392 991 A1 | 10/1990 | European Pat. Off. . |
| 2 345 791 | 10/1977 | France . |
| 2 409 578 | 6/1979 | France . |
| 33 16 037 C2 | 11/1983 | Germany . |
| 35 07 680 A1 | 9/1986 | Germany . |
| 36 28 505 A1 | 7/1987 | Germany . |
| 501 296 | 2/1971 | Switzerland . |
| 634 943 A5 | 2/1983 | Switzerland . |
| 2 085 642 | 4/1982 | United Kingdom . |

*Primary Examiner*—Daniel D. Wasil
*Attorney, Agent, or Firm*—Herbert L. Lerner; Laurence A. Greenberg

[57] ABSTRACT

A fast shutdown system and a process for the fast shutdown of a nuclear reactor, include a reactor core and a plurality of control rods which are disposed side by side and can be inserted into and withdrawn from the reactor core. The plurality of control rods has a number of operating groups into which the control rods are categorized or fitted for regulating the power of the nuclear reactor, as well as a number of shutdown groups into which the control rods are categorized or fitted for the fast shutdown of the nuclear reactor. The control rods of at least two operating groups are allocated to each shutdown group or the control rods of at least two shutdown groups are allocated to each operating group. Due to such an allocation of the control rods among shutdown groups and operating groups, it is assured that even upon startup of the nuclear reactor, when not all of the control rods have yet been withdrawn, at least some of the already withdrawn control rods will be reinserted into the reactor core during a fast shutdown involving failure of the insertion of the control rods of one shutdown group. Preferably, two shutdown groups are provided, and each shutdown group is assigned to a single hydraulic insertion system.

17 Claims, 2 Drawing Sheets

FAST SHUTDOWN SYSTEM AND PROCESS FOR FAST SHUTDOWN OF A NUCLEAR REACTOR

CROSS-REFERENCE TO RELATED APPLICATION

This application is a Continuation of International Application Serial No. PCT/DE95/01611, filed Nov. 20, 1995.

BACKGROUND OF THE INVENTION

Field of the Invention

The invention relates to a fast shutdown system of a nuclear reactor having a reactor core and a plurality of control rods which are disposed side by side and can be inserted into and withdrawn from the reactor core. The invention also relates to a process for the fast shutdown of a nuclear reactor.

In a nuclear reactor, in particular a boiling water reactor or pressurized water reactor, regulation of the nuclear chain reaction takes place above all through the use of so-called control rods, which are inserted into individual fuel assemblies or between them and absorb neutrons. The control rods are used not only for regulating the power of the nuclear reactor, for instance upon startup as well as during normal operation, but also for a fast shutdown of the nuclear reactor in the event of a malfunction.

In a pressurized water reactor, the control rods are inserted into the fuel assemblies from above. During normal operation of the nuclear reactor, the control rods are predominantly withdrawn from the fuel assemblies and retained by suitable devices, such as magnetic latches. In a malfunction situation, those devices are released, and the control rods drop into the fuel assemblies due to their own weight. Any control rods that may jam may optionally be introduced later into the fuel assemblies through a hydraulic mechanism, an electrical spindle drive, or the like.

In a boiling water reactor, the control rods as a rule are inserted into the reactor core from below. A fast shutdown of a boiling water reactor is effected, for instance, through a hydraulic drive, through which the control rods are shot in between the fuel assemblies of the reactor core. It is known for a hydraulic fast shutdown to connect the control rods to two mutually separate ring lines. Each control rod is connected to each of the ring lines for safety reasons and especially because of the typical demand for a redundant structure. If one of the ring lines fail, then insertion of the control rods is effected at least through the remaining ring lines. In order to assure that, the ring lines are decoupled from one another at each control rod drive through the use of a special valve. That valve assures that if one ring line fails, no hydraulic fluid from the functional ring line can enter the failed ring line and thus prevent the insertion of the control rod. Such a valve is not only expensive to make and must be checked regularly, but it also requires coupling of the ring lines, which are intrinsically redundant. If a plurality of such valves fail, that would eliminate the redundancy.

Swiss Patent 634 943 describes a gas-cooled, graphite-moderated nuclear reactor with two mutually independent shutoff systems. Absorber rods which are used for shutting off and regulating the nuclear reactor can be inserted into the core. They are allocated to two different shutoff systems, which function independently of one another. The first shutoff system is intended for full or long-term shutdown, while the second is for partial or fast shutdown. The absorber rods of the second shutoff system are located between the absorber rods of the first shutoff system.

German Patent DE 33 16 037 C2, corresponding to U.S. Pat. No. 4,605,530, describes a process for driving a nuclear power plant system, especially a boiling water reactor. The boiling water reactor has many control rods for controlling the power output, and those control rods can be both inserted into the core and withdrawn from the core. The control rods used to operate the boiling water reactor are located in an outer peripheral region of the core and form a first group. All of the other control rods form a second group, and during normal operation of the reactor some of the control rods of the second group are inserted at least partway into the core, while all of the other control rods are retracted from the core. In the event of a malfunction ascertained outside the reactor and requiring a reactor power reduction, the control rods of the second group that have been inserted into the core remain inserted in the core, and further selected control rods of the second group as well as the control rods of the first group are subjected to a fast shutdown process and are inserted into the core so fast that the power of the reactor is reduced to a value less than in normal operation, which however is still adequate for the intrinsic needs of the nuclear power plant system. Thus the reactor continues to be operated with the reduced power. The selected control rods of the second group are chosen in such a way that they are not located next to one another.

U.S. Pat. No. 4,632,803 relates to a process for controlling a boiling water reactor, the thermal power of which is controlled by control rods that are insertable into and retractable from the core and by controlling a recirculating pump for recirculating coolant through the reactor core. If the recirculating pump is shut off, which dictates a reduction in coolant throughput through the reactor core, the position of the individual control rods, or in other words the degree to which they have been inserted into the reactor core, is varied in such a way that a fast shutdown of the boiling water reactor becomes unnecessary. Then control rods that were inserted to only a slight depth in the reactor core are inserted into it to approximately half the height of the reactor core. In addition, control rods that were inserted into the reactor core far beyond the halfway point of its height are retracted to approximately half the height, or the control rods that were not inserted into the reactor core at all are then inserted to approximately half the height of the reactor core.

SUMMARY OF THE INVENTION

It is accordingly an object of the invention to provide a fast shutdown system and a process for fast shutdown of a nuclear reactor, which overcome the hereinafore-mentioned disadvantages of the heretofore-known systems and methods of this general type, in which the fast shutdown system has redundance and assures a fast shutdown with adequate safety even in the event of a partial failure and in which the method has redundance for the fast shutdown of a nuclear reactor, in particular a boiling water reactor.

With the foregoing and other objects in view there is provided, in accordance with the invention, a fast shutdown system of a nuclear reactor, comprising a reactor core; and a plurality of control rods disposed side by side for insertion into and withdrawal from the reactor core; the plurality of control rods being categorized or fitted into a number of operating groups for power regulation of the nuclear reactor; the plurality of control rods being categorized or fitted into a number of shutdown groups for a fast shutdown of the nuclear reactor; and the control rods of at least two of the operating groups being allocated to each of the shutdown groups, or the control rods of at least two of the shutdown groups being allocated to each of the operating groups.

Through the use of this kind of allocation of the control rods among a number of redundant shutdown groups and a number of operating groups, it is assured in every power state of the nuclear reactor, particularly in a warmup operation and in full-load operation, that even in the event of a fast shutdown with failure of the insertion of control rods of one shutdown group, enough control rods are inserted into the reactor core so that subcriticality of the nuclear reactor for a minimum length of time, but at least a power reduction to a slight residual power, is assured. Since upon a startup of a reactor, that is in the so-called warmup operation, the control rods are retracted in succession from the reactor core in accordance with predetermined, operationally dictated sequences, all of the retracted control rods, if the control rods are allocated identically to operating groups and shutdown groups, might not be able to be inserted again in the event of a failure.

Such problems are also reliably prevented by distributing the control rods of each shutdown group among at least two operating groups, or distributing the control rods of each operating group to at least two shutdown groups, so that the fast shutdown system is constructed in redundant fashion. Thus even upon startup of the nuclear reactor, some of the already-retracted control rods, in the event of a fast shutdown involving failure of the insertion of control rods of one shutdown group, or in other words in the event of a failure, are reinserted into the reactor core.

In accordance with another feature of the invention, the fast shutdown system has at least two mutually independent insertion systems for inserting the control rods into the reactor core, and the control rods of one shutdown group are connected to a single insertion system. The fast shutdown system is made redundant by using two mutually independent insertion systems and by strict separation of the shutdown groups allocated to the respective insertion systems. Any interaction between the two insertion systems is thus precluded in principle.

In accordance with a further feature of the invention, the fast shutdown system has two operating groups, the control rods of which are disposed in checkerboard-like fashion relative to one another. Control rods of the operating groups can be retracted from the reactor core and reinserted into the reactor core in subgroups in accordance with the operationally dictated sequences. If the control rods of one of the two operating groups are fully retracted, then by the allocation of the control rods to different shutdown groups it is assured that even in the event of a failure, at least some of the retracted control rods are reinserted upon a fast shutdown.

In accordance with an added feature of the invention, the fast shutdown system has an allocation of the control rods among two shutdown groups. Each of the shutdown groups may be inserted independently of one another into the reactor core through a separate insertion system. Since the two shutdown groups are in no instance identical to two operating groups, the fast shutdown system is made redundant, and upon a fast shutdown enough control rods are reinserted into the reactor core to achieve subcriticality of the nuclear reactor.

In accordance with an additional feature of the invention, an approximately equal number of control rods are allocated to each shutdown group. When the control rods are divided into precisely two shutdown groups, the allocation of the control rods is such that about half are assigned to each of the shutdown groups. If the control rods are divided into precisely two operating groups disposed in checkerboard-like fashion relative to one another, then each shutdown group contains approximately half of the control rods of the respective operating groups. Thus the control rods of each operating group are each allocated approximately half to one shutdown group and half to the other shutdown group. As a result, upon a fast shutdown, even if one of the shutdown groups fails, at least half of the retracted control rods of each operating group are reinserted into the reactor core.

In accordance with yet another feature of the invention, the fast shutdown system includes two shutdown groups, in which the control rods are each disposed in pairs and disposed in approximately checkerboard-like fashion relative to one another. Thus a checkerboard pattern of pairs of control rods is obtained for the control rods assigned to the shutdown groups. In a checkerboard pattern of individual control rods of the operating groups, each pair of one shutdown group thus includes one control rod of a first operating group and one control rod of a second operating group.

In accordance with yet a further feature of the invention, the control rods of each shutdown group are distributed largely uniformly over the cross-section of the reactor core. As a result, upon a fast shutdown with failure of the insertion of control rods of one shutdown group, a simultaneous prevention of the nuclear chain reaction is assured over the cross section of the reactor core.

With the objects of the invention in view, there is also provided a process for the fast shutdown of a nuclear reactor having a reactor core and a plurality of control rods disposed side by side, which comprises dividing, categorizing or fitting control rods into a number of operating groups; inserting the control rods into and withdrawing the control rods from a reactor core in accordance with the operating groups during normal operation of a nuclear reactor; categorizing or fitting the control rods into a number of shutdown groups each having control rods from at least two of the operating groups; connecting each of the shutdown groups to a single respective one of at least two mutually independent insertion systems; and activating the insertion systems in a malfunction situation for inserting the control rods.

As a result of the mutually independent insertion systems and a connection of each of the shutdown groups to only one insertion system, in the event of a fast shutdown the insertion of the control rods of different shutdown groups is effected entirely independently of one another. Any influence of the insertion systems on one another continues to be precluded, thus making for a redundant process. A fast shutdown accomplished by this process produces subcriticality of the nuclear reactor, or at least reduces the power to a slight residual level. Optionally, additional steps can be taken to attain durable subcriticality, such as feeding boron or subsequently inserting control rods mechanically.

Other features which are considered as characteristic for the invention are set forth in the appended claims.

Although the invention is illustrated and described herein as embodied in a fast shutdown system and a process for fast shutdown of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
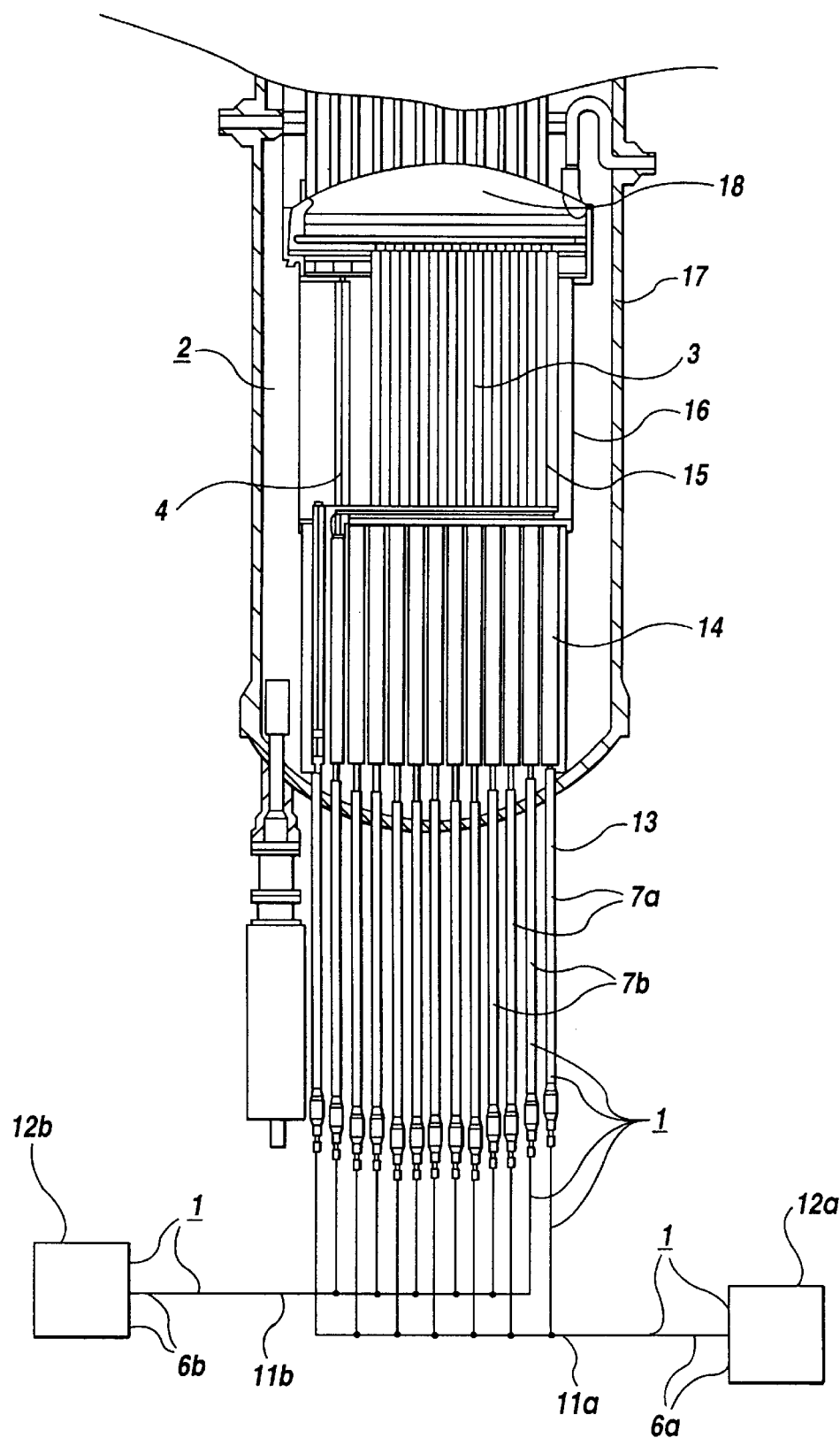
FIG. 1 is a fragmentary, diagrammatic, longitudinal-sectional view of a nuclear reactor with a fast shutdown system.

Referring now in detail to the figures of the drawings, in which only components essential to an explanation are shown, and first, particularly, to FIG. 1 thereof, there is seen a longitudinal section of a nuclear reactor 2 with a pressure vessel 17 and a fast shutdown system 1. Fuel assemblies 15 are located in a reactor core 3 which is surrounded by a core jacket 16 and is disposed inside the pressure vessel 17. The core jacket 16 has a core lid 18, below which the fuel assemblies 15 are disposed. Immediately below the fuel assemblies 15 are control rod guide tubes 14 for guiding control rods 4, so that the control rods 4 can be inserted and retracted between the fuel assemblies 15. The control rod guide tubes 14 each have an end opposite the fuel assemblies 15 which merge with control rod drives 13 that extend in pressure-tight fashion out of the pressure vessel 17.

The control rods 4 with their associated control rod drives 13 are disposed in a first shutdown group 7a and a second shutdown group 7b. The control rod drives 13 of the first shutdown group 7a are connected to a first ring line 11a, which is in turn connected to a first hydraulic pressure reservoir 12a for inserting the control rods 4 into the reactor core 3. The first ring line 11a, the first hydraulic pressure reservoir 12a and the associated control rod drives 13 are part of a first insertion system 6a. A second insertion system 6b includes a second ring line 11b which communicates with a second hydraulic pressure reservoir 12b and correspondingly associated control rod drives 13. The second insertion system 6b acts upon the second shutdown group 7b of the control rods 4.

The two-part redundant structure of the fast shutdown system 1 assures that in the event of a fast shutdown of a nuclear reactor 2, even if there is a failure of the insertion of control rods 4 of one shutdown group 7a, 7b, approximately 50% of the retracted control rods 4 are inserted into the reactor core 3, thereby achieving subcriticality of the nuclear reactor 2 for a minimum length of time, or at least a power reduction to a slight residual power.

Figure 2:
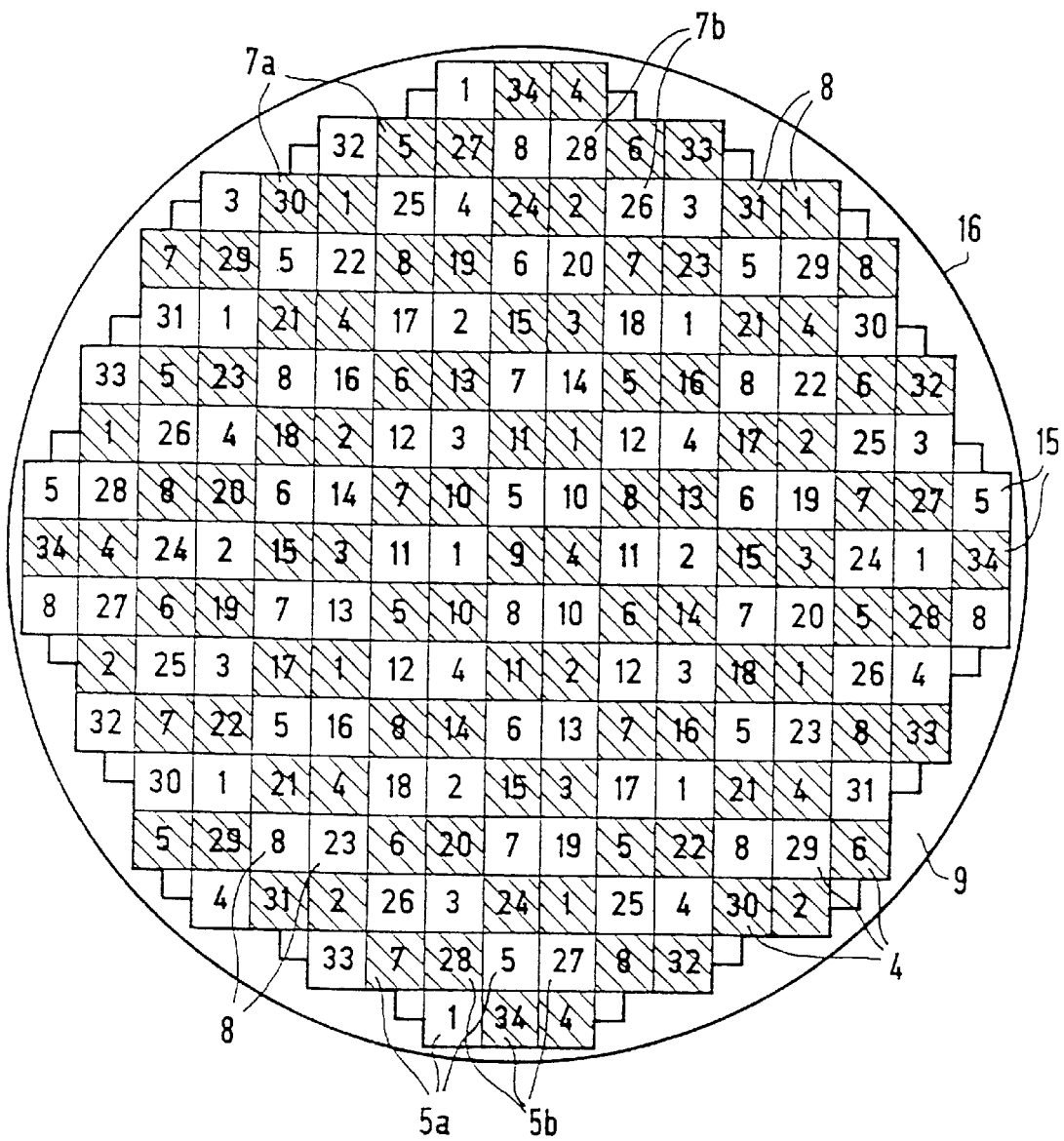
FIG. 2 is a cross-sectional view taken through a reactor core of the nuclear reactor.

In FIG. 2, an allocation of the control rods 4 to a first operating group 5a and a second operating group 5b as well as to a first shutdown group 7a and a second shutdown group 7b is shown. To that end, FIG. 2 shows a cross section 9 through the reactor core 3. The individual control rods 4 are not shown, for the sake of simplicity. Instead, the control rods 4 of the operating groups 5a, 5b are each represented symbolically with respective numbers. The numbers 1–8 symbolize control rods of the first operating group 5a, and the numbers 9–34 symbolize control rods 4 of the second operating group 5b. The control rods 4 of the two operating groups 5a, 5b are disposed in checkerboard-like fashion relative to one another. A division of the control rods 4 into the two shutdown groups 7a, 7b is effected in pairs 8 of control rods 4. The pairs 8 shown shaded are assigned to the first shutdown group 7a, and the unshaded pairs 8 are assigned to the second shutdown group 7b. The pairs 8 of the two shutdown groups 7a, 7b are likewise disposed in checkerboard-like fashion, so that each pair 8 includes one control rod 4 of the first operating group 5a and one control rod 4 of the second operating group 5b. Approximately half of the control rods 4 are assigned to each of the two shutdown groups 7a, 7b. The control rods 4 of each shutdown group 7a, 7b are moreover disposed largely uniformly over the cross section 9.

During normal operation of the nuclear reactor 2, the control rods 4 are moved in accordance with predetermined sequences. Before a startup, all of the control rods 4 are initially inserted into the reactor core 3. In order to attain criticality and for an ensuing warmup operation, the control rods 4 of the first operating group 5a are first retracted successively from the reactor core 3, in the order 1, 2, 3, 4, 5, 6, 7, 8. Due to the paired allocation of the control rods 4 to the first shutdown group 7a and the second shutdown group 7b, it is assured even during a warmup operation of the nuclear reactor 2 that approximately 50% of the already-retracted control rods 4 can be reinserted into the reactor core 3 upon a fast shutdown, even if the insertion of control rods 4 of one shutdown group 7a, 7b should fail.

The invention is distinguished by a fast shutdown system with redundance for a nuclear reactor, in particular a boiling water reactor. In the fast shutdown system, the control rods are allocated to at least two operating groups and at least two shutdown groups each. The allocation is carried out in such a way that each shutdown group is assigned control rods from at least two operating groups, and/or each operating group is assigned control rods from at least two shutdown groups. This assures that even in a warmup operation of the nuclear reactor, in which only some of the control rods are retracted, at least half of the already-retracted control rods are reinserted into the reactor core upon a fast shutdown. Through the use of a complete decoupling of the insertion systems assigned to the shutdown groups, influence on a functional insertion system by a defective insertion system is precluded with certainty, and at least the full scope of the desired redundance exists.

I claim:

1. A fast shutdown system of a nuclear reactor, comprising:

a reactor core; and a plurality of control rods disposed side by side for insertion into and withdrawal from said reactor core;

said plurality of control rods being categorized into a number of operating groups for power regulation of the nuclear reactor;

said plurality of control rods being categorized into a number of shutdown groups for a fast shutdown of the nuclear reactor; and said control rods of at least two of said operating groups being allocated to each of said shutdown groups.

2. A fast shutdown system of a nuclear reactor, comprising:

a reactor core; and a plurality of control rods disposed side by side for insertion into and withdrawal from said reactor core;

said plurality of control rods being categorized into a number of operating groups for power regulation of the nuclear reactor;

said plurality of control rods being categorized into a number of shutdown groups for a fast shutdown of the nuclear reactor; and said control rods of at least two of said shutdown groups being allocated to each of said operating groups.

3. The fast shutdown system according to claim 1, including at least two mutually independent insertion systems for inserting said control rods into said reactor core, said control rods of each of said shutdown groups being connected to a single respective one of said insertion systems.

4. The fast shutdown system according to claim 2, including at least two mutually independent insertion systems for inserting said control rods into said reactor core, said control rods of each of said shutdown groups being connected to a single respective one of said insertion systems.

5. The fast shutdown system according to claim 1, wherein said number of operating groups are two operating groups, and said control rods of said two operating groups are disposed in a checkerboard-like manner relative to one another.

6. The fast shutdown system according to claim 2, wherein said number of operating groups are two operating groups, and said control rods of said two operating groups are disposed in a checkerboard-like manner relative to one another.

7. The fast shutdown system according to claim 1, wherein said number of shutdown groups are two shutdown groups.

8. The fast shutdown system according to claim 2, wherein said number of shutdown groups are two shutdown groups.

9. The fast shutdown system according to claim 1, wherein an approximately equal number of control rods are allocated to each of said shutdown groups.

10. The fast shutdown system according to claim 2, wherein an approximately equal number of control rods are allocated to each of said shutdown groups.

11. The fast shutdown system according to claim 1, wherein pairs of said control rods disposed side by side are allocated to each of said shutdown groups.

12. The fast shutdown system according to claim 2, wherein pairs of said control rods disposed side by side are allocated to each of said shutdown groups.

13. The fast shutdown system according to claim 11, wherein said number of shutdown groups are two shutdown groups, and said pairs of said control rods of said two shutdown groups are disposed in an approximately checkerboard-like manner relative to one another.

14. The fast shutdown system according to claim 12, wherein said number of shutdown groups are two shutdown groups, and said pairs of said control rods of said two shutdown groups are disposed in an approximately checkerboard-like manner relative to one another.

15. The fast shutdown system according to claim 1, wherein said control rods of each of said shutdown groups are distributed substantially uniformly over a cross-section of said reactor core.

16. The fast shutdown system according to claim 2, wherein said control rods of each of said shutdown groups are distributed substantially uniformly over a cross-section of said reactor core.

17. A process for the fast shutdown of a nuclear reactor having a reactor core and a plurality of control rods disposed side by side, which comprises:

categorizing control rods into a number of operating groups;

inserting the control rods into and withdrawing the control rods from a reactor core in accordance with the operating groups during normal operation of a nuclear reactor;

categorizing the control rods into a number of shutdown groups each having control rods from at least two of the operating groups;

connecting each of the shutdown groups to a single respective one of at least two mutually independent insertion systems; and activating the insertion systems in a malfunction situation for inserting the control rods.

* * * * *